United States Patent [19]

Kachi et al.

[11] Patent Number: 5,184,340
[45] Date of Patent: Feb. 2, 1993

[54] METHOD AND APPARATUS FOR RECORDING AND REPRODUCING INFORMATION ON AN OPTICAL MEDIUM

[75] Inventors: Kenjiro Kachi, Tsurugashima; Kazuo Noda, Yokohama, both of Japan

[73] Assignee: Nippon Conlux Co., Ltd., Tokyo, Japan

[21] Appl. No.: 260,603

[22] Filed: Oct. 20, 1988

[30] Foreign Application Priority Data

Oct. 23, 1987 [JP] Japan .................................. 62-266212

[51] Int. Cl.[5] .............................................. G11B 7/00
[52] U.S. Cl. ................................ 369/44.37; 369/44.41
[58] Field of Search ........................ 369/30, 32, 43–47, 369/44.37, 44.41; 358/342; 250/201; 235/454, 470

[56] References Cited

U.S. PATENT DOCUMENTS

| | | | |
|---|---|---|---|
| 4,616,354 | 10/1986 | Yoshida | 369/46 X |
| 4,730,295 | 3/1988 | Bressers | 369/46 |
| 4,787,075 | 11/1988 | Matsuoka et al. | 369/46 X |
| 4,787,076 | 11/1988 | Deguchi et al. | 369/46 |

Primary Examiner—Robert L. Richardson
Attorney, Agent, or Firm—Koda and Androlia

[57] ABSTRACT

A method and an apparatus for recording and reproducing information comprising irradiating a light spot for recording and reproducing information and a plurality of light spots for tracking an information-recording region of an optical information-recording medium including tracks or guiding, projecting reflected beams from the optical information-recording medium due to said light spot for recording and reproducing information and plurality of light spots for tracking on a photosensor, and selecting two outputs from a plurality of electrical outputs for tracking from said photosensor to provide tracking-control signals.

10 Claims, 4 Drawing Sheets

METHOD AND APPARATUS FOR RECORDING AND REPRODUCING INFORMATION ON AN OPTICAL MEDIUM

BACKGROUND OF THE INVENTION

1. Field of the Art

This invention relates to a method and an apparatus for recording (writing) or reproducing (reading) information by using optical information-recording media, such as optical cards, optical disks or the like, and more particularly relates to a method and an apparatus for recording in and reproducing from card-like optical information recording media, i.e., optical cards, in which tracks for the purpose of tracking are provided.

2. Prior Art

Heretofore, as optical information-recording media of this kind, so-called write-once type optical cards in which it is possible to record only once, and to reproduce a plurality of times are well known. In the write-once optical card, information is recorded as a row of pits (information tracks) which are optically detectable, by focusing a light beam which is modulated according to the information to be recorded into a minute light spot by a lens, and by irradiating and scanning the minute light spot on an information-recording region of the optical card. Since it is necessary to arrange the row of pits systematically, for example rectilinearly, and with a predetermined interval in the information-recording region for the convenience of reproducing information, there have hitherto been provided tracks for the purpose of guiding in write-once type optical cards.

The provision of the tracks for guiding is, however, a cause which hinders increase of the information-recording capacity.

SUMMARY OF THE INVENTION

Objects

The present invention has been accomplished in order to solve such a disadvantage. It is an object of the present invention to provide a method and an apparatus for recording on and reproducing from an optical card in which a plurality of information tracks are formed in an information-recording region thereof to increase the recording capacity.

Means for Solving Problems

In order to achieve the above-described object, the present invention provides:

a method for recording and reproducing information comprising irradiating a light spot for recording and reproducing information and a plurality of light spots for tracking on an information-recording region of an optical information-recording medium including tracks for guiding, projecting reflected beams from the optical information-recording medium due to said light spot for recording and reproducing information and plurality of light spots for tracking on a photosensor, and selecting two outputs from a plurality of electrical outputs for tracking from said photosensor to provide tracking-control signals; and an apparatus for recording and reproducing information comprising a light source for projecting at least three light spots for information read-out and for tracking on an optical information-recording medium including tracks for guiding, a photosensor for detecting information, plural pairs of photosensors for following tracks which are located at predetermined positions relative to the photosensor for detecting information, switching connectors to which a pair of the photosensors for following tracks are connected on one side and on another side relative to said photosensor for detecting information, respectively, and a circuit for obtaining a difference between two signals which are outputs from the switching connectors, to perform tracking control so that said difference between two signals becomes zero.

Function

A plurality of light spots for recording and reproducing information and for tracking are irradiated on the above-described optical information-recording medium. Information is therefore recorded in the information tracks on the optical information-recording medium. On the optical information-recording medium, a plurality of information tracks are formed between two tracks for guiding, the reflected light from each of these tracks is detected by a photosensor, respectively, and the information is reproduced.

These photosensors consist of a photosensor for detecting information and plural pairs of photosensors for following tracks. A pair of photosensors for following tracks are selected, and tracking control is performed by using signals from the selected pair of photosensors. When the pair of photosensors for tracking control is determined as described above, the information-recording track to be read by the photosensor for detecting information which is disposed at a predetermined position relationship relative to these pair of photosensors is automatically determined. On the other hand, when another pair of photosensors for following tracks is selected, the photosensor for detecting information reads out information from some other information track.

Effect of the Invention

As explained above, a method for recording and reproducing information according to the present invention has a great effect such that recording capacity can be increased several times without modifying the optical cards.

BRIEF DESCRIPTION OF THE DRAWINGS

FIGS. 6 through 11 are diagrams showing embodiments of the present invention, in which:

FIG. 6 is a diagram in which four light spots irradiated on an information-recording region;

FIG. 7 is a diagram showing a configuration of a photodiode which is divided into eight elements, five reflecting beam spots and synthesis of the outputs of two photodiodes;

FIG. 8 is a diagram in which four light spots which are partially different from those in FIG. 6 are irradiated on an information-recording region;

FIG. 9 is a diagram showing three examples in which five light spots are irradiated on an information recording region;

FIG. 10 is a diagram showing a configuration of a photodiode which is divided into ten elements, seven reflecting beam spots and synthesis of the outputs of two photodiodes;

FIG. 11 is a diagram in which positions irradiated by four light spots in FIG. 6 are modified;

DETAILED DESCRIPTION OF THE INVENTION

Related Art

In the above-described write-once type optical card, tracks for guiding are formed by means, such as exposure, development or the like by photographic technique, and hence the line width of a track itself cannot be very narrow and the variance in the line width is also large. Consequently, a write-once type optical card (briefly termed an optical card hereafter) has hitherto been formed, for example, as shown in FIG. 12.

Figure 12:
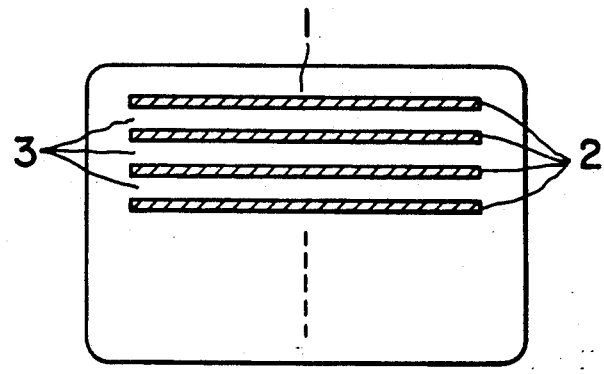
FIG. 12 is a diagram showing tracks for guiding which are formed on an optical card and an information-recording region.

In FIG. 12, tracks 2 for guiding which have, for example, a reduced optical reflectivity are provided on an optical card 1, and information is to be recorded on an information-recording region 3 which is provided between the tracks 2 for guiding. For example, the line width of tracks 2 for guiding is 3 μm, the line width of the information-recording region 3 is 17 μm, and accordingly the track pitch is about 20 μm.

Figure 13:
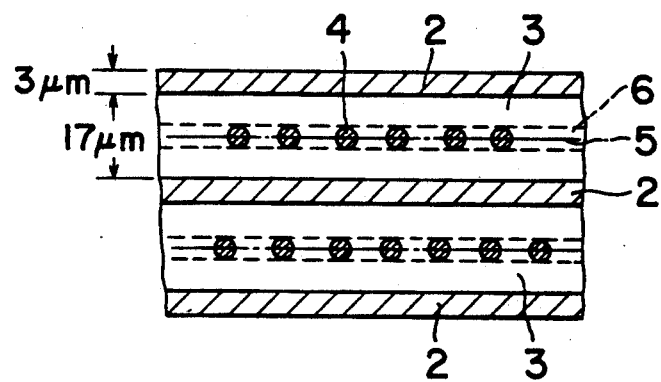
FIG. 13 is a diagram showing tracks for guiding, an information-recording region and a row of information pits (information tracks).

FIG. 13 is an enlarged diagram of a part of FIG. 12, in which information pits 4 are recorded on a track on a center line 5 of the information-recording region 3 to form an information track 6 (a region which is placed between two dotted lines). In this case, the information pits 4 have dimensions with a diameter of, for example, 5 μm, and optical reflectivity thereof becomes smaller than that of other regions.

An optical card has a feature, in general, that it has a recording capacity larger than a magnetic card or the like, but the conventional recording method as shown in FIG. 13 does not fully utilize the feature.

In general, in order to increase recording capacity, the dimensions of an information pit should be small. In the case of an optical card, however, making the information pits smaller is not very effective for the increase of recording capacity because of a limitation in the dimensions of a track pitch by using photographic techniques. That is, there exists a disadvantage that even when information pits are made smaller, an extremely large portion remains which is not utilized for information recording within the information-recording region 3.

Embodiments

Figure 1:
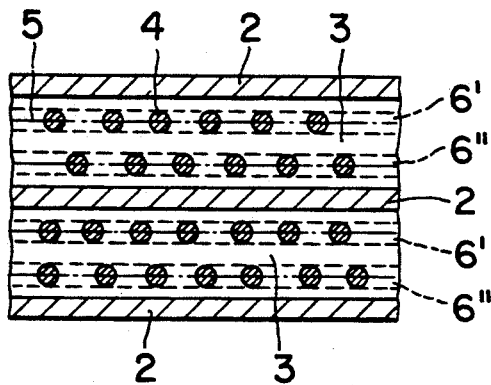
FIG. 1 is a diagram in which two information tracks are formed in an information-recording region according to the present invention.
Figure 2:
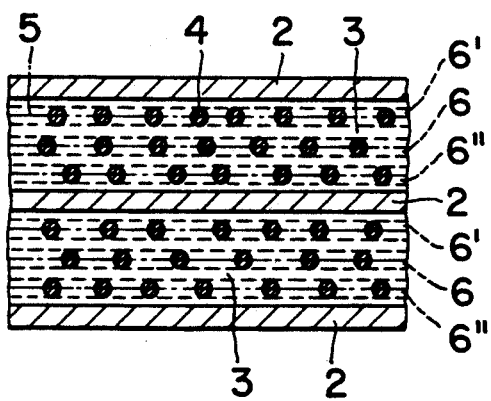
FIG. 2 is a diagram in which three information tracks are formed in an information-recording region according to the present invention.

FIGS. 1 and 2 show embodiments in which a plurality of information tracks are formed on optical cards to increase the recording capacity according to the present invention.

In FIG. 1, two information tracks 6′ and 6″ are formed on an information recording region 3, and thus the recording capacity is double that of the conventional case of using only one track. In FIG. 2, three information tracks 6, 6′ and 6″ are formed on the information recording region 3 to increase the recording capacity three times than the conventional case.

Figure 3:
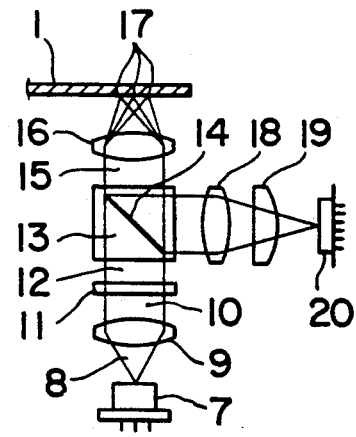
FIG. 3 is a diagram showing a configuration of an optical head for recording and reproducing for a plurality of information tracks according to the present invention.

FIG. 3 is a diagram showing a configuration of an optical head for recording and reproducing for a plurality of information tracks used for embodying the method of the present invention. In FIG. 3, a light beam 8 irradiated from a light source 7, such as a semiconductor laser or the like, is converted into a parallel beam 10 by a collimating lens 9 and is then projected on a diffraction grating 11 to produce a plurality of, i.e., 0-order and ±n-order (n is 1, 2, 3,—) transmitting diffraction lights.

The plurality of transmitting diffraction lights, i.e., plural beams 12 projected on a beam splitter 13, and plural beams 15 which have transmitted through a semitransparent film 14 (the ratio of the intensity of transmitting light to reflected light may be other than 1) of the beam splitter 13, are focused into plural minute light spots 17 (termed light spots hereafter) by a focusing lens 16 to irradiate upon the information-recording region 3 of the optical card 1. When this occurs, a high output-power light in which the light source 7 is modified by information signals is used for recording information, and a continuous low output-power light is used for reproducing information.

Plural reflected beams from the optical card 1 move backward through the focusing lens 16 and become nearly parallel beams (they sometimes become slightly converging beams or diverging beams depending on focusing situation), are reflected by the semi-transparent film 14 of the beam splitter 13 to be directed towards the right, are reduced into smaller beams by a light-receiving lens 18, and then reach a photodiode 20 through a cylindrical lens 19. From the photodiode 20, information signals, focusing signals indicating focusing situations of the light spots 17 and tracking signals indicating the position of the light spots 17 relative to the tracks 2 for guiding are obtained. It will be noted that the light-receiving lens 18 is an optical unit for reducing plural reflected parallel beams into smaller beams, and that the cylindrical lens 19 is an optical unit for producing astigmatism to obtain focusing-control signals.

Figure 4:
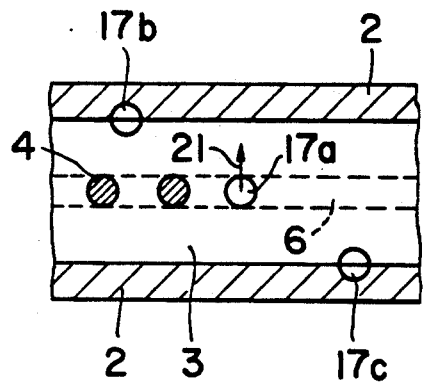
FIG. 4 is a diagram showing three light spots for irradiating on an information-recording region.

FIG. 4 shows three light spots 17a, 17b and 17c which are to be irradiated upon the information-recording region 3 of the optical card 1. The light spot 17a is due to the 0-order diffraction light of the diffraction grating 11, and the light spots 17b and 17c are due to +1st-order diffraction light and −1st-order diffraction light of the diffraction grating 11, respectively. In FIG. 4, they are disposed in positions which are shifted The light spot 17a forms information pits 4 with a high light energy in the case of recording information, and scans the information tracks 6 with a low light energy and reads out the information pits 4 from a change in the reflectivity of light in the case of reproducing information.

The light spots 17b and 17c are for tracking purposes. They have a light energy smaller than the light spot 17a, and partly irradiate tracks 2 for guiding, respectively. When the light spot 17a scans the information tracks 6 (the situation is relatively the same when the optical card is moved), the light spot 17a usually runs off from an information track 6 due to causes, such as mechanical error or the like, and crosses many information tracks 6 to make it impossible to record and reproduce information. In order to prevent such running-off from the information track 6, a servo-control is performed for the motor so that the light spot 17a correctly follows and scans the information track 6. When the center of the light spot 17a is deviated to either direction from the center line of the information track 6, the light spots 17b and 17c are deviated to the same direction by the same amount. For example, in FIG. 4, when the light spot 17a is slightly deviated to a direction of an arrow 21, a portion of the track 2 for guiding which the light spot 17b irradiates increases, hence the intensity of reflected light is decreased, and a portion of the track 2 for guiding which the light spot 17c irradiates decreases, hence the intensity of reflected light is increased.

Figure 5:
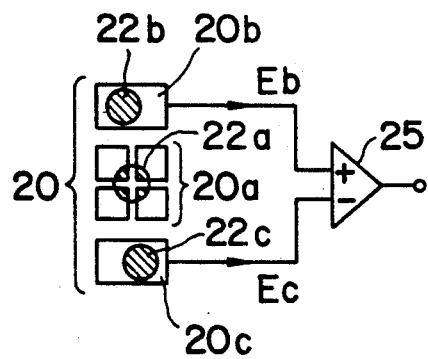
FIG. 5 is a diagram showing a configuration of a photodiode which is divided into six elements, three reflecting beam spots and synthesis of the outputs of two photodiodes.

Accordingly, when the photodiode 20 is divided into six elements consisting of 20a, 20b and 20c as shown in FIG. 5, and reflected beam spots 22b and 22c due to the light spots 17b and 17c are projected on the photodiodes 20b and 20c, respectively, an electrical output Eb from the photodiode 20b decreases, and an electrical output Ec from the photodiode 20c increases. Consequently, when the difference between outputs of 20b and 20c Eb−Ec is taken out as a differential output 25, and the light spot 17a is controlled so that $Eb-Ec=0$, i.e., the differential output 25 becomes zero, the light spot 17a can always follow and scan the center of the information track 6.

It will be noted that the reflected beam spot 22a due to the light spot 17a is projected on the photodiode 20a, which is one of the four photodiodes divided from the photodiode 20, to produce information signals and focusing-control signals.

Figure 6:
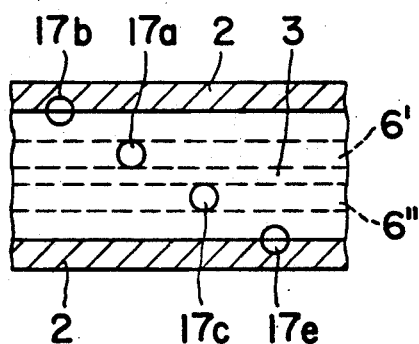

FIG. 6 shows an embodiment in which the information track 6' is recorded and reproduced in the information-recording region 3. On the information-recording region 3, the light spot 17a due to the 0-order diffraction light, the light spot 17b due to the +1-order diffraction light and the light spot 17e due to the −2nd-order diffraction light of the diffraction grating 11 are irradiated. The light spot 17c and the like also irradiate, but the explanation thereof will be omitted because they have no direct relationship with operations in this embodiment.

Figure 8:
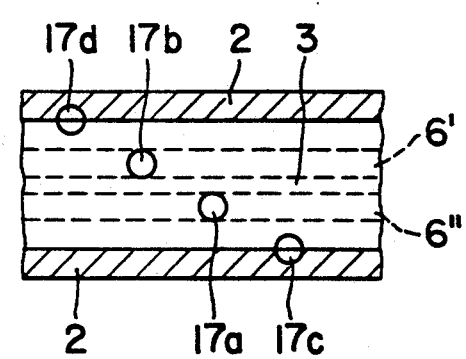

The photodiode 20 is divided into eight elements as shown in FIG. 8. The reflected beam spots 22b and 22e due to the light spots 17b and 17e are projected on the photodiodes 20b and 20e, respectively, and switches 23 and 24 are turned towards a terminal a. The difference of outputs Eb−Ee between an electrical output Eb from the photodiode 20b and an electrical output Ee from the photodiode 20e is then taken out as a differential output 25, and the light spot 17a is controlled so that $Eb-Ee=0$, i.e., the differential output 25 becomes zero. By such an operation, the light spot 17a can follow and scan the information track 6'.

FIG. 8 shows an embodiment in which the information track 6'' is recorded and reproduced. On the information-recording region 3, the light spot 17a due to the 0-order diffraction light, the light spot 17d due to the +2nd-order diffraction light and the light spot 17c due to the −1st-order diffraction light or the like of the diffraction grating 11 are irradiated.

Figure 7:
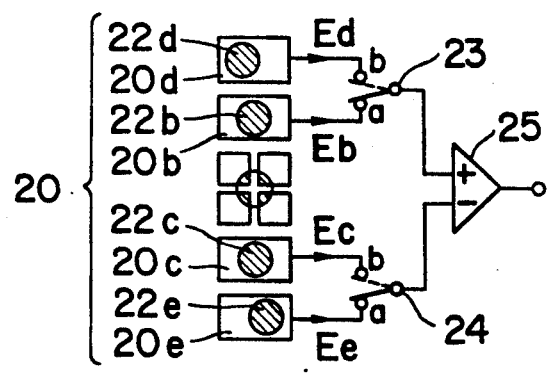

The photodiode 20 is as already shown in FIG. 7. The reflected beam spots 22d and 22c due to the light spots 17d and 17c are projected on the photodiodes 20d and 20c, respectively, and the switches 23 and 24 are turned towards a terminal b. The difference of outputs Ed−Ec between an electrical output Ed from the photodiode 20d and an electrical output Ec from the photodiode 20c is then taken out as a differential output 25, and the light spot 17a is controlled so that $Ed-Ec=0$, i.e., the differential output 25 becomes zero. Thus, the light spot 17a can follow and scan the information track 6''.

Figure 9:
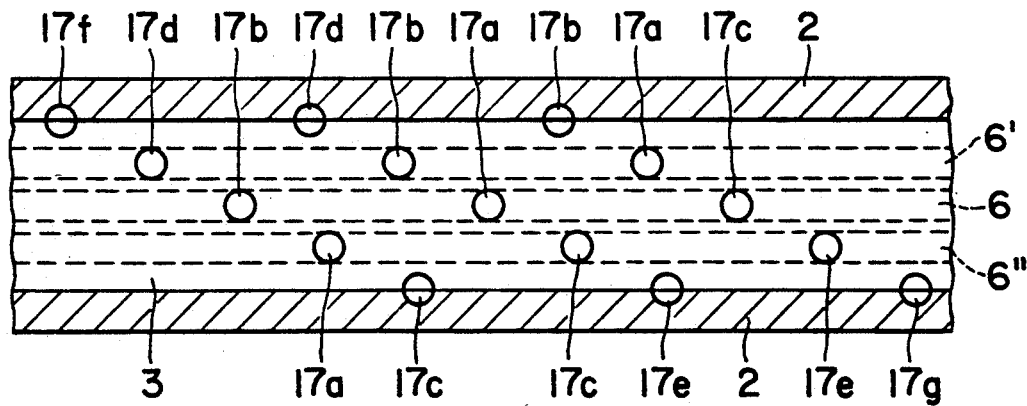

FIG. 9 shows an embodiment in which the three information tracks 6, 6' and 6'' are recorded and reproduced in the information-recording region 3. In FIG. 9, all embodiments are simultaneously shown as a whole, contrary to FIGS. 6 and 8 in which each embodiment has been shown separately.

In FIG. 9, for recording and reproducing the information track 6 in the information-recording region 3, the light spot 17a due to the 0-order diffraction light, the light spot 17d due to the +2nd-order diffraction light, the light spot 17e due to the −2nd-order diffraction light or the like of the diffraction grating 11 are irradiated on the information-recording region 3.

Figure 10:
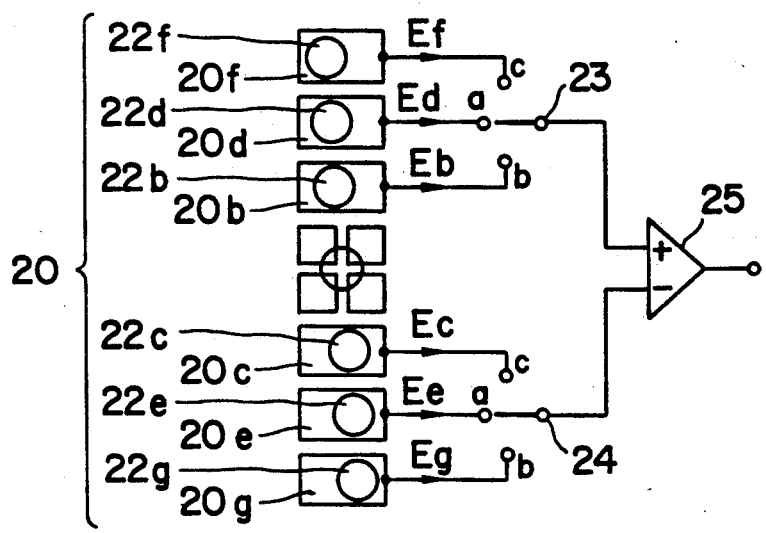

The photodiode 20 is divided into 10 elements as shown in FIG. 10. The reflected beam spots 22d and 22e due to the light spots 17d and 17e are projected on the photodiodes 20d and 20e, respectively, and the switches 23 and 24 are turned towards the terminal a. The light spot 17a is then controlled so that $Ed-Ee=0$, i.e., the differential output 25 becomes zero, where Ed is an electrical output from the photodiode 20d, and Ee is an electrical output from the photodiode 20e. By such an operation, the light spot 17a can follow and scan the information track 6.

Next, for recording and reproducing the information track 6' in the information-recording region 3, the light spot 17a due to the 0-order diffraction light, the light spot 17b due to the +1-order diffraction light, the light spot 17g due to the −3rd-order diffraction light or the like of the diffraction grating 11 are irradiated upon the information-recording region 3.

Referring to the photodiode 20 in FIG. 10, the reflected beam spots 22b and 22g due to the light spots 17b and 17g are projected on the photodiodes 20b and 20g, respectively, and the switches 23 and 24 are turned towards the terminal b. The light spot 17a is then controlled so that $Eb-Eg=0$, i.e., the differential output 25 becomes zero, where Eb and Eg are electrical outputs from the photodiodes 20b and 20g, respectively. Thus, the light spot 17a can follow and scan the information track 6'.

Similarly, for recording and reproducing the information track 6'' in the information-recording region 3, the light spots 17a, 17f, 17c or the like due to the 0-order diffraction light, the +3rd-order diffraction light, the −1st-order diffraction light or the like of the diffraction grating 11, respectively, are irradiated upon the information-recording region 3.

Referring again to the photodiode 20 in FIG. 10, the reflected beam spots 22f and 22c due to the light spots 17f and 17c are projected on the photodiodes 20f and 20c, respectively, and the switches 23 and 24 are turned towards a terminal c. The light spot 17a is then controlled so that $Ef-Ec=0$, i.e., the differential output 25 becomes zero, where Ef and Ec are electrical outputs from the photodiodes 20f and 20c, respectively. Thus, the light spot 17a can follow and scan the information track 6".

Although the explanation of the present invention states that the two light spots for tracking irradiate an end portion of the information-recording region 3 as well as a part of the tracks 2 for guiding, these two light spots for tracking may be set so that they irradiate the adjacent information-recording region 3 as well as part of the tracks 2 for guiding. That is, the embodiment in FIG. 6 may be set as shown in FIG. 11.

Figure 11:
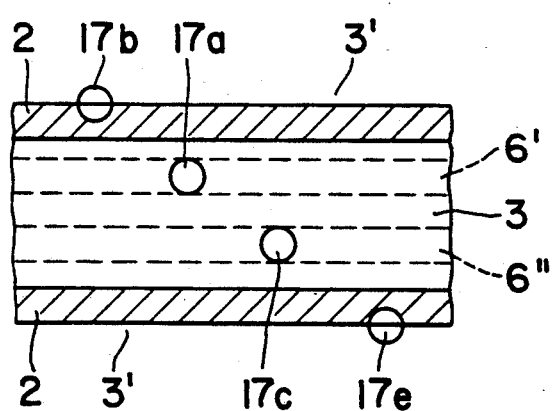

In FIG. 11, the light spots 17b and 17e are not on the information-recording region 3 which includes the information tracks 6' and 6", but are on end portions of the adjacent information-recording regions 3', respectively. In the embodiment in FIG. 11, the electrical output Eb from the photodiode 20b and the electrical output Ee from the photodiode 20e shown in FIG. 7 are opposite in phase compared with the embodiment in FIG. 6. Hence, the phase of the differential output 25 in FIG. 7 becomes reverse in phase, and it is necessary to operate an amplifier which amplifies the differential output 25 by reversing the polarity. It will be noted that the setting of irradiation of the light spots for tracking on the adjacent information-recording regions 3' as described above is also applicable to the embodiments in FIGS. 8 and 9.

Furthermore, in the foregoing explanation, the light spots for tracking are operated by partially irradiating a track 2 for guiding which is nearest to the light spot 17a for information, but the track 2 for guiding to be irradiated is not necessarily the nearest track for guiding; it may be an adjacent track for guiding or an adjacent track but one for guiding.

As explained above, according to the present invention, it is possible to record and reproduce two information tracks by using the light spot 17a due to the 0-order diffraction light and the light spots 17b and 17e, 17d and 17c due to the diffraction lights of up to ±2nd-order of the diffraction grating 11, and three information tracks by using the light spots 17d and 17e, 17b and 17g, 17f and 17c due to the diffraction lights of up to ±3rd-order diffraction lights, and further four or more information tracks by using the light spots due to the diffraction lights of ±4th-order or more.

It will be noted that the number of the information tracks 6 to be selected for recording and reproducing in the information-recording region 3 depends on the setting angle of the diffraction grating 11. That is, the number of the information-recording tracks 6 is determined by the light spots, forming the order which diffraction lights are to partially irradiate on the tracks 2 for guiding in order to be operated for tracking purpose, by adjusting an angle formed between a line which links the light spots 17a, 17b, 17c and the like and the tracks 2 for guiding.

The light spot 17a is automatically guided on the information track where information is to be recorded and reproduced by a mere switching of the switches 23 and 24. This is performed as follows. When the light spot 17 scans the information-recording region 3, it crosses the tracks 2 for guiding due to causes, such as mechanical error or the like. At the moment of crossing, two outputs from the photodiode 20 become equal, and tracking servo operates to make the point at which the outputs become equal to a stable point. Furthermore, when it is required to guide the light spot 17 definitely within a short period of time, the light spot 17 may be slightly swept in a direction perpendicular to the tracks 2 for guiding.

In general, in tracking of the light spot 17, the focusing lens 16 is driven in a direction perpendicular to the tracks 2 for guiding in the optical card 1 by an electromagnetic force in most cases. This method may be applied to the embodiments of the present invention.

Accordingly, in order to provide servo control for the tracking, the differential output 25 in FIGS. 5, 7 and 10 may be properly amplified, and the output thereof may be applied to a focusing lens-driving coil of a tracking-drive system with a polarity so as to form a negative feedback loop. It will be noted that the sweeping of the light spot 17, when the light spot 17a is guided in a short period of time as described above, can be achieved by applying sweep signals to the focusing lens-driving coil.

The configuration of the optical head shown in FIG. 3 shows an example, and hence it will be apparent that the application of the present invention is not limited to the configuration in FIG. 3.

The kind or location of an optical unit may be modified: The beam splitter 13 in FIG. 3 may be modified, for example, into a combination of a polarizing prism and a ¼ wavelength plate; or a location of the collimating lens 9 may be modified to a portion between the beam splitter 13 and the focusing lens 16. For taking out focusing-control signals, a method other than the astigmatism method may be used.

As the diffraction grating 11, a phase grating is generally used in order to decrease a loss of transmission light. It is also desirable to properly select a relationship between amplitude and phase, and to set so that the intensity of the 0-order diffraction light is large, the intensities of diffraction lights of other than 0-order are small (for example, a few fractions of the intensity of the 0-order diffraction light), and the intensities of diffraction lights of other than 0-order to be used are nearly equal in intensity to each other.

The photodiode 20 is divided into elements the number of which differs according to the number of the information tracks 6. When the astigmatism method is used for focusing, the photodiode 20 is divided into six elements when there is one information track 6, divided into eight elements when there are two information tracks 6, divided into ten elements when there are three information tracks 6 and so forth, i.e., the number of division increases by two for each increment in the number of information tracks 6. The switches 23 and 24 may be interlocked, and it is necessary to provide as many switching terminals as the number of information tracks 6. It is needless to say that either mechanical switches or electronic switches are applicable.

In the foregoing explanation of the present invention, write-once type optical cards have been exemplified and explained in detail as the optical information-recording media. The present invention is not limited, however, to write-once type optical cards, and is also applicable to erasable type optical cards or the like, and is further applicable to optical disks or the like.

We claim:

1. A method for recording and reproducing information recorded on an optical recording medium, said medium having at least one information track and at least two guiding tracks positioned on both sides of the information track respectively, comprising:
    irradiating a light spot for recording and reproducing information on the information track and a plurality of light spots for tracking on the guiding tracks of the optical recording medium, respective parts of said plurality of light spots irradiating the guiding tracks;

projecting reflected beams from the optical recording medium responding to said light spots on photosensor having a photosensor for detecting information and at least two photosensors for detecting guiding tracks;

the reflected beam from the information track being projected on said photosensor for detecting information and the reflected beam from said guiding tracks being projected on said photosensors for detecting the guiding tracks; and producing two outputs from a plurality of electrical outputs of said photosensors for tracking to provide tracking-control signals.

2. A method for recording and reproducing information according to claim 1 wherein the reflected beams are projected on a photosensor which is divided into a plurality of elements.

3. A method for recording and reproducing information according to claim 1 wherein the electrical outputs for tracking from the photosensor unit are read out by switching means.

4. An apparatus for recording an reproducing information recorded on an optical recording medium having an information track and at least two guiding tracks comprising:

a light source for projecting a light spot for reading out information and at least two light spots for tracking the guiding tracks of the optical recording medium, respective parts of said light spots for tracking irradiating the guiding tracks;

a photosensor for detecting information from the information track;

at least a pair of photosensors for tracking the guiding tracks which photosensors are located at predetermined positions on both sides of said photosensor for detecting information; and a circuit for obtaining a difference between two signals provided by said pair of photosensors, thereby to perform tracking control, making the difference between two signals zero.

5. An apparatus for recording and reproducing information according to claim 4 wherein said photosensor for detecting information is divided into four elements.

6. An apparatus for recording and reproducing information according to claim 4 wherein said switching means comprises a pair of switches.

7. An apparatus for recording and reproducing information recorded on an optical recording medium having at least two information tracks and at least two pairs of guiding tracks comprising:

a light source for projecting a light spot for reading out information and at least two light spots for tracking the guiding tracks of the optical recording medium, respective parts of said light spots for tracking irradiating the guiding tracks;

a photosensor for detecting information from one of the information track;

at least two pairs of photosensors for following the guiding tracks which photosensors are located at predetermined positions relative to said photosensor for detecting information;

at least two switching means to which at least two pairs of photosensors for following tracks are connected respectively so a to select a pair of photosensors to be consistent with one of the information tracks; and a circuit for obtaining a difference between two signals provided by said switching means, thereby to perform tracking control, making the difference between two signals zero.

8. An apparatus for recording and reproducing information according to claim 7 wherein said photosensor for detecting information is divided into four elements.

9. An apparatus for recording and reproducing information according to claim 7 wherein said switching means comprises a pair of switches.

10. A method for recording and reproducing information according to claim 2 or 1 wherein the reflected beams are projected on the photosensor via a focusing lens, a semi-transparent film and a cylindrical lens.

* * * * *